Nov. 24, 1942.   F. W. GEHRKE   2,303,207
BASE TYPE RANGE FINDER FOR MEDIUM RANGES AND SHORT DISTANCES
Filed Oct. 11, 1940
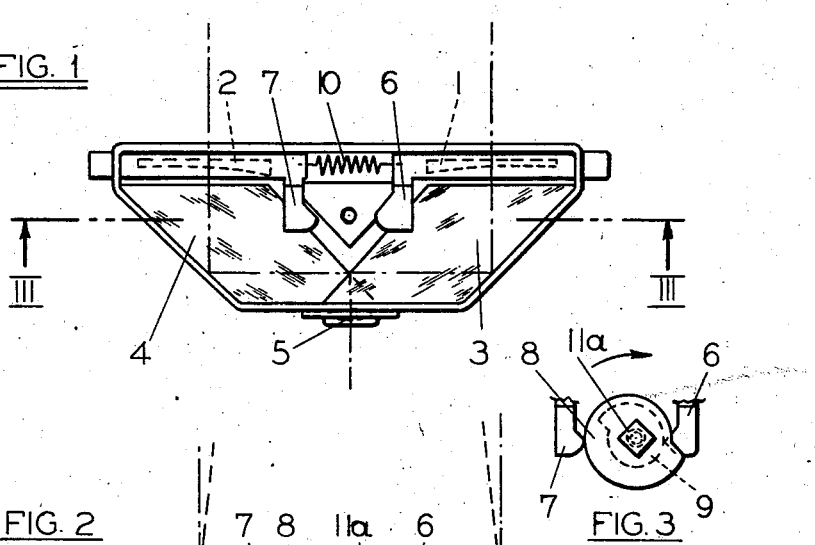
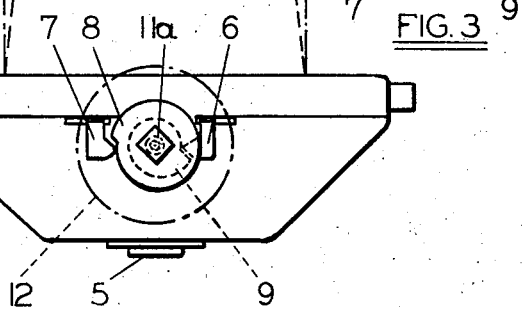
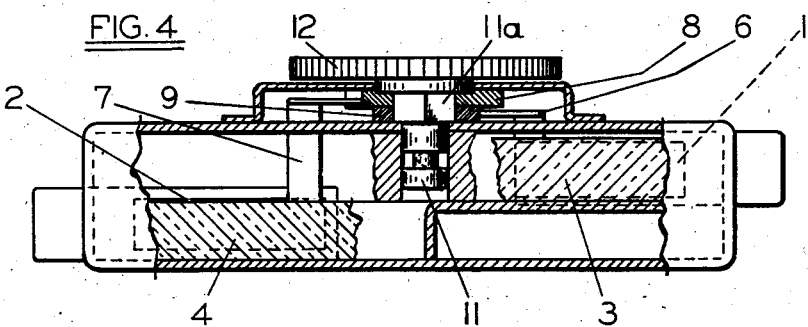
FRIEDRICH WILHELM GEHRKE
INVENTOR
BY
ATTORNEYS Patented Nov. 24, 1942

2,303,207

UNITED STATES PATENT OFFICE 2,303,207

BASE TYPE RANGE FINDER FOR MEDIUM RANGES AND SHORT DISTANCES

Friedrich Wilhelm Gehrke, Munich, Germany, assignor to General Aniline & Film Corporation, New York, N. Y., a corporation of Delaware Application October 11, 1940, Serial No. 360,732
In Germany October 18, 1939

2 Claims. (Cl. 88—2.7)

This invention relates to a range finder, particularly to a base type range finder for measuring medium ranges and very short distances.

One of its objects is a process of measuring ranges.

Another object is a range finder.

Still another object is a range finder for measuring small distances, especially distances below one meter.

Further objects will be seen from the accompanying drawing and detailed specification.

The present invention relates to a symmetric base type range finder which is to be used especially for photographic cameras and which serves both for the determination of the usual distances also for the exact determination of distances below one meter. In order to measure the distance of very close objects, it has previously been proposed to employ additional lenses which at a definite very small distance of the object bring the two separate images into exact registry with each other. This method of determining the range, however, has the disadvantage of the additional lenses. To put these lenses on and to take them off again when changing from near to distant pictures and vice versa makes the handling of such a range finder rather difficult.

According to the present invention it has been proposed to render the lens-wedges situated in front of the light entrance of the base type range finder displaceable successively parallel to the base of the range finder, in order to adjust the range finder to medium and close ranges. Preferably both lens-wedges are moved in succession by the same adjusting device. The arms of the lens-wedges are held by means of a spring, in firm contact with two control-disc-cams which are mounted on the axis of the adjusting device. One control-disc-cam serves for the displacement of one lens-wedge, in order to adjust ranges from infinity to one meter, the other disc-cam adjusts the second lens-wedge for ranges below one meter, for example 50 cm. and 25 cm. The adjustment can be accomplished gradually or in steps.

The invention is illustrated diagrammatically. and by way of example on the accompanying drawing, in which Figure 1 is a plane view of a symmetrical range finder the cover plate being removed.

Figure 2 is also a plane view of a range finder the adjusting device being removed. The range finder is adjusted to very close objects.

Figure 3 is a single view of the two control-disc-cams with two adjacent levers of contact.

Figure 4 is a section of the view finder on line III—III of Figure 1.

The light rays reflected from the object to be photographed penetrate through the lens-wedges 1 and 2 into the prisms 3 and 4, the latter forming the base of the range finder, and are thrown into the eye of the observer by the eye-piece 5 after being reflected twice. Whereas in such base type range finders only one lens element was movably arranged hitherto, the other one being stationary, according to the present invention both lens-wedges 1 and 2 are rendered displaceable in succession parallel to the base of the prisms 3 and 4, in order to deviate the light beams in various ways. The two supports of the lens-wedges 1 and 2 contact the disc-cams 8 and 9 through the contacting arms 6 and 7. These arms 6 and 7 are pressed by a spring 10 onto the disc-cams 8 and 9. The disc-cams 8 and 9 are rigidly mounted onto the squared portion 11a of the axis 11 of the adjusting device 12. By means of the adjusting device 12 it is possible to adjust the range finder to medium ranges or very close ranges. Whereas the contacting arm 6 sliding along on the disc-cam 9 does not change its position when the adjusting device is adjusted from infinity to one meter, since the portion of disc-cam 9 then in contact therewith is of circular shape (seen in counterclockwise direction), it is readily lifted up when the adjusting device is adjusted to ranges below one meter (see Figure 3) thus displacing the lens-wedge 1. The disc-cam 8 is so shaped that it displaces the contacting lever 7 and therewith the lens element 2 at distances from infinity down to one meter. At distances below one meter the lever is not moved. The disc-cam 8 is therefore (seen in counterclockwise direction) in the first instance eccentric to the axis 11, whereas it is centric to the axis 11 later on.

What I claim is:

1. Symmetric base type range finder for measuring medium ranges and very short distances comprising two prisms forming the base of said range finder, two lens wedges disposed in front of said prisms, means for displacing said lens wedges in succession parallel to said base and a single means for operating said first means.

2. Symmetric base type range finder for measuring medium ranges and very short distances comprising two prisms forming the base of said range finder, two lens wedges disposed in front of said prisms, supports for said lens wedges, a lever projecting from each support, a shaft carried by said finder, two disc cams rigidly fixed to said shaft, means for pressing said levers against said disc cams, and means for rotating said shaft and thus said dism cams to effectuate successive movement of said lens wedges.

FRIEDRICH WILHELM GEHRKE.